United States Patent
Floersch et al.

(10) Patent No.: US 9,204,723 B2
(45) Date of Patent: Dec. 8, 2015

(54) ACCESSORIES SUPPORT BRACKET

(71) Applicant: Target Brands, Inc., Minneapolis, MN (US)

(72) Inventors: David J. Floersch, Brooklyn Park, MN (US); Alex K. Poniatowski, Brooklyn Park, MN (US); Peter J. Floersch, Lakeville, MN (US); Charles E. Jondal, Jordan, MN (US); Cory D. Benson, Savage, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 14/253,179

(22) Filed: Apr. 15, 2014

(65) Prior Publication Data

US 2015/0289651 A1  Oct. 15, 2015

(51) Int. Cl.
*A47F 7/00* (2006.01)
*A47B 97/00* (2006.01)
*F16M 11/04* (2006.01)

(52) U.S. Cl.
CPC ............... *A47B 97/00* (2013.01); *F16M 11/04* (2013.01); *A47B 2097/006* (2013.01)

(58) Field of Classification Search
CPC ....... F16M 11/08; F16M 11/10; F16M 11/04; A47B 97/00
USPC ........... 211/26; 248/205.1, 286.1; 361/679.41
See application file for complete search history.

(56) References Cited

U.S. PATENT DOCUMENTS

| | | | |
|---|---|---|---|
| D350,127 S | 8/1994 | Gummeson et al. | |
| D381,967 S | 8/1997 | Tatsumi | |
| 5,687,939 A * | 11/1997 | Moscovitch | 248/122.1 |
| 5,850,998 A | 12/1998 | Parsey et al. | |
| 6,049,450 A | 4/2000 | Cho et al. | |
| 7,032,824 B2 | 4/2006 | Miyazawa et al. | |
| 7,044,374 B2 | 5/2006 | Allison et al. | |
| 7,369,401 B1 | 5/2008 | Floersch et al. | |
| 7,434,774 B1 | 10/2008 | Floersch et al. | |
| 7,459,634 B2 | 12/2008 | Martin et al. | |
| 7,525,696 B2 | 4/2009 | Carnevali et al. | |
| 7,559,520 B2 * | 7/2009 | Quijano et al. | 248/309.1 |
| 7,813,118 B2 * | 10/2010 | Burge | 361/679.41 |
| D629,808 S * | 12/2010 | Sapper | D14/452 |

(Continued)

FOREIGN PATENT DOCUMENTS

DE  202012101136  5/2012

OTHER PUBLICATIONS

Engineered Network Systems, "Modular POS System," http://www.ens-co.com/flat_panel_monitor_mount_Modular_POS_System_ENS_Inc, at least as early as Apr. 2014, 2 pages.

*Primary Examiner* — Basil Katcheves
(74) *Attorney, Agent, or Firm* — Leanne Taveggia Farrell; Westman, Champlin & Koehler, P.A.

(57) ABSTRACT

A support or mounting bracket includes a fixed portion having a first mounting surface and a second mounting surface opposite the first mounting surface. The first mounting surface couples to a display screen and the second mounting surface couples to a support stand. The support bracket also includes at least one free portion that extends from the fixed portion and couples to an arm plate and at least one connecting portion that couples the at least one free portion to the fixed portion. The arm plate includes a proximal end mounted to the at least one free portion and distal end that supports a peripheral device.

8 Claims, 9 Drawing Sheets

(56) References Cited

U.S. PATENT DOCUMENTS

| | | |
|---|---|---|
| 7,997,211 B2* | 8/2011 | Peterson et al. .............. 108/42 |
| 8,033,515 B2 | 10/2011 | Martin et al. |
| 8,066,241 B2* | 11/2011 | Yu et al. .................. 248/286.1 |
| 8,083,189 B2* | 12/2011 | Sun et al. ................. 248/122.1 |
| 8,162,268 B1* | 4/2012 | Huang ...................... 248/124.1 |
| D660,308 S * | 5/2012 | Huang ........................ D14/452 |
| 8,240,628 B2* | 8/2012 | Huang ...................... 248/316.1 |
| 8,317,146 B2 | 11/2012 | Jung et al. |
| 8,833,716 B2* | 9/2014 | Funk et al. ................ 248/316.4 |
| 2008/0316689 A1* | 12/2008 | Moscovitch ................. 361/680 |
| 2009/0090825 A1* | 4/2009 | Jung et al. ................. 248/205.1 |
| 2010/0128423 A1* | 5/2010 | Moscovitch ............ 361/679.01 |
| 2010/0213328 A1 | 8/2010 | Smith et al. |
| 2010/0288895 A1 | 11/2010 | Shamie |
| 2012/0025046 A1 | 2/2012 | Yen |
| 2012/0187056 A1* | 7/2012 | Hazzard et al. ................. 211/26 |
| 2012/0285908 A1* | 11/2012 | Vincent .......................... 211/26 |
| 2012/0318938 A1* | 12/2012 | Huang ...................... 248/124.1 |
| 2013/0092805 A1 | 4/2013 | Funk et al. |

* cited by examiner

ACCESSORIES SUPPORT BRACKET

BACKGROUND

Homes, offices or businesses, such as retail stores, include work environments where placement of technology equipment can be personalized or designed to efficiently make use of work space. One exemplary piece of equipment that can be used to organize technology is a support stand. Technology equipment can be mounted to the support stand for ease of access.

The discussion above is merely provided for general background information and is not intended to be used as an aid in determining the scope of the claimed subject matter.

SUMMARY

A support or mounting bracket includes a fixed portion having a first mounting surface and a second mounting surface opposite the first mounting surface. The first mounting surface couples to a display screen and the second mounting surface couples to a support stand. The support bracket also includes at least one free portion that extends from the fixed portion and couples to an arm plate and at least one connecting portion that couples the at least one free portion to the fixed portion. The arm plate includes a proximal end mounted to the at least one free portion and distal end that supports a peripheral device.

A support or mounting plate includes a base defined by four sides, a plurality of wing members each having a fixed end and a free end and being oriented substantially parallel with the base and a plurality of transition areas. Each transition area coupling the fixed end of each wing member to the base and orienting each wing member out-of-plane from the base.

A method of assembling a computer workstation includes coupling a back of a support bracket to a support stand. The support bracket includes a base defined by four sides, four wing members each extending from one of the four sides of the base and four transition areas that couple each wing member to the base and orients each wing member out-of-plane from the base. The method further includes mounting at least one arm plate to a front of one of the four wing members of the support bracket. The at least one arm plate extends from a proximal end to a distal end and supports an accessory. Still further, the method includes mounting a display screen to a front of the base of the support bracket.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A computer workstation, such as a point-of-sale system in a retail store, supports and organizes access to not only a display screen, such as a computer monitor, and a keyboard or touch pad, but also to peripheral or accessory devices. Exemplary accessory devices include an optical scanner or reader, a biometric reader, a printer, electronic payment processing module, a video camera, etc. An accessory support bracket allows the peripheral or accessory devices to be placed in proximity to the display screen and keyboard or touch pad for convenient access. More specifically, the accessory support bracket is positioned between a support stand and the display screen and includes portions for attaching arm plates. Each arm plate extends from the portions of the accessory support bracket and supports one or more peripheral or accessory devices.

Figure 1:
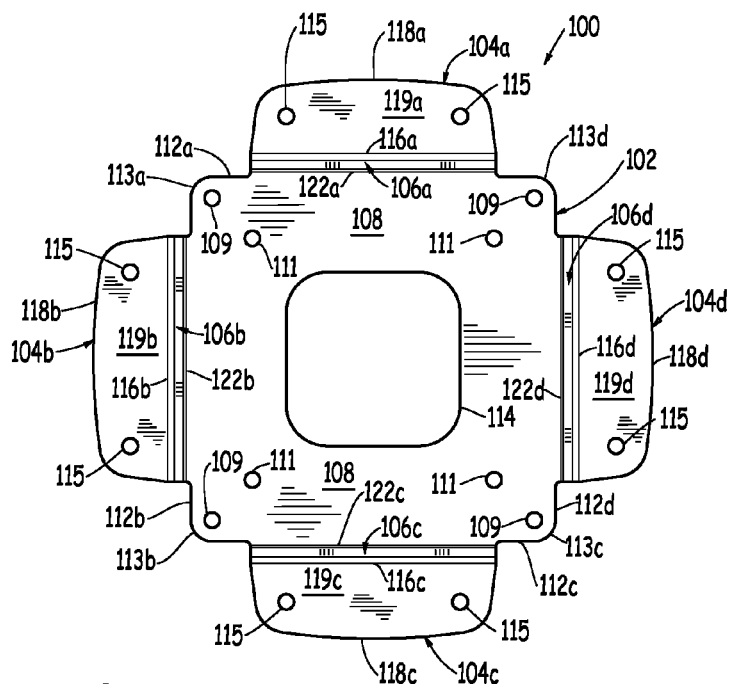
FIG. 1 is a front view of an accessory support bracket in accordance with an embodiment.
Figure 3:
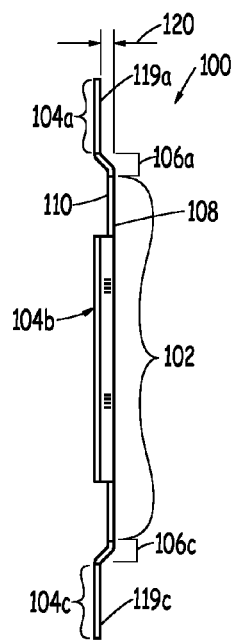
FIG. 3 is a side view of the accessory support bracket illustrated in FIG. 1.
Figure 2:
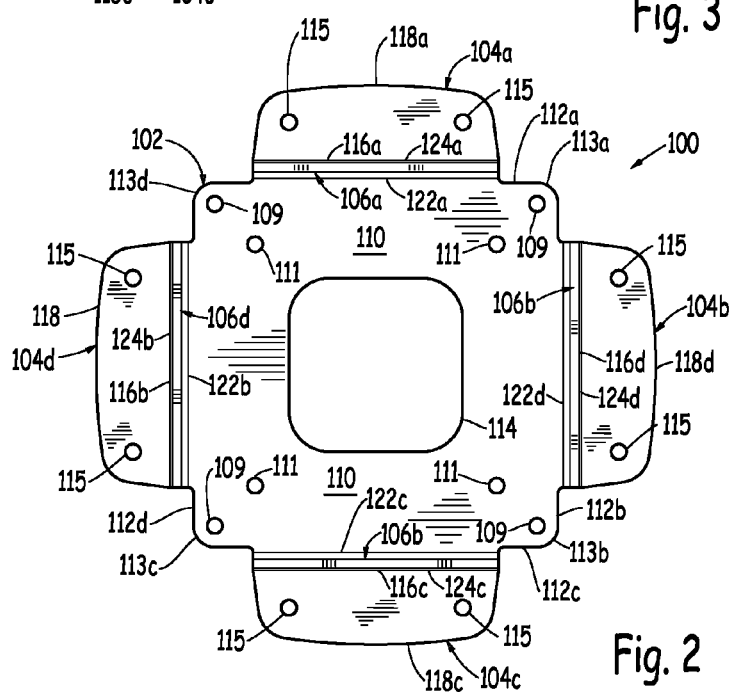
FIG. 2 is a back view of the accessory support bracket illustrated in FIG. 1.
Figure 4:
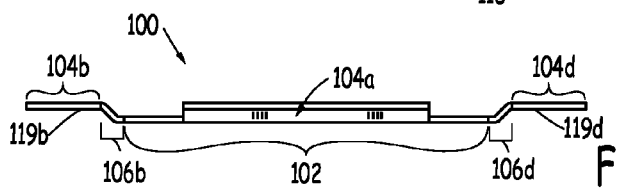
FIG. 4 is a top view of the accessory support bracket illustrated in FIG. 1.

FIG. 1 is a front view, FIG. 2 is a back view, FIG. 3 is a left side view (the right side, being a minor image) and FIG. 4 is a top view (the bottom being a mirror image) of an accessory support bracket or mounting plate 100 in accordance with one embodiment. Accessory support bracket 100 includes a fixed portion or base 102, a plurality of free portions or wing members 104 that extend from the fixed portion or base 102 and a plurality of connecting members or transition areas 106 that couple free portions or wing members 104 to fixed portion or base 102.

Base 102 is positioned between a display screen and a support stand and includes a first or front mounting (support) surface 108 and an opposing second or back mounting (support) surface 110. In one embodiment, front mounting surface 108 faces the display screen and back mounting surface 110 faces the support stand. Fasteners are inserted through mounting apertures 109 to couple base 102 to the support stand and to couple base 102 to the display screen. Mounting apertures 111 provide an alternative or additional place for fasteners to be inserted depending on the size and configuration of the display screen and the support stand. Exemplary fasteners include screws and pins.

Base 102 is defined by four sides 112a, 112b, 112c and 112d. Top side 112a connects left side 112b to right side 112d at corners 113a and 113d. Bottom side 112a connects left side 112b to right side 112d at corners 113b and 113c. In one embodiment, base 102 further includes a central hole 114. Central hole 114 extends through the material of base 102 from front mounting surface 108 to back mounting surface 110. In other embodiments, base 102 does not include central hole 114.

In one embodiment, accessory support bracket 100 includes a top wing member 104a, a left side wing member 104b, a bottom wing member 104c, a right side wing member 104d, a top connecting portion 106a, a left side connecting portion 106b, a bottom connecting portion 106c and a right side connecting portion 106d. Wing members 104a-d include fixed ends 116a-d and free ends 118a-d. Each of the four sides 112a, 112b, 112c and 112d of base 102 is coupled to one of the connecting portions 106a-d and each connecting portion 106a-d couples the fixed end 116a-d of one of the wing members 104a-d to base 102. As illustrated in FIGS. 3 and 4, each connecting portion 106a-d orients each corresponding wing member 104a-d out-of-plane from front mounting surface 108 of base 102 by a distance 120 (FIGS. 3 and 4), while front surfaces 119a-d each wing member 104a-d is substantially parallel with front mounting surface 108 of base 102. In one embodiment and as will be discussed in detail below, at least one of the wing members 104a-d couples to an arm plate that supports a peripheral device. The arm plate couples to the at least one of the wing member 104a-d using mounting apertures 115. Mounting apertures 115 are located between fixed ends 116a-d and free ends 118a-d.

While FIGS. 1-4 illustrate accessory support bracket 100 as having a definitive front and a definitive back, the top, the bottom and the sides are interchangeable. In this way, accessory support bracket 100 can be mounted so that any of wing members 104a-d can be at the top, at the bottom or one of the sides.

In one embodiment, accessory support bracket 100 is made of a single, continuous piece of material, such as steel, where connecting portions 106a-d and wing members 104a-d are formed by bending the material out-of-plane from front mounting surface 108 of base 102. For example and with reference to FIGS. 1-4, the material is bent at first connecting bend lines 122a, 122b, 122c and 122d and at second connecting bend lines 124a, 124b, 124c and 124d to define each connecting portion 106a-d and to orient front surfaces 119a-d of each wing member 104a-d, which remains substantially parallel with front mounting surface 108 of base 102, out-of-plane from base 102. In other embodiments, base 102, connecting portions 106a-d and wing members 104a-d are made of individual pieces of material that are connected together by, for example, welding or fastening.

Figure 5:
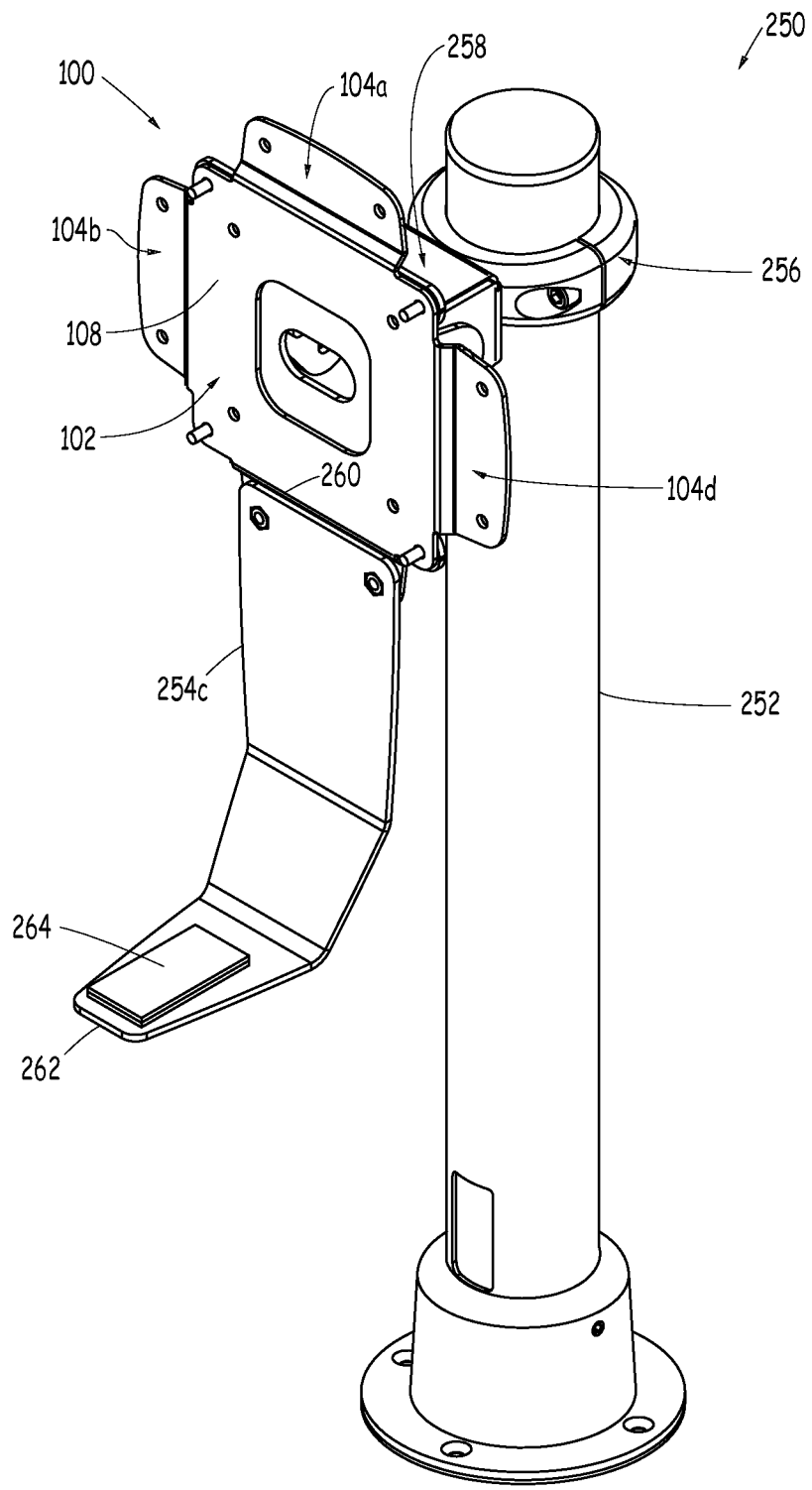
FIG. 5 is a front perspective view of an accessory mount assembly in accordance with one embodiment and including the accessory support bracket illustrated in FIGS. 1-4 mounted to a support stand and an arm plate attached to the accessory support bracket.
Figure 6:
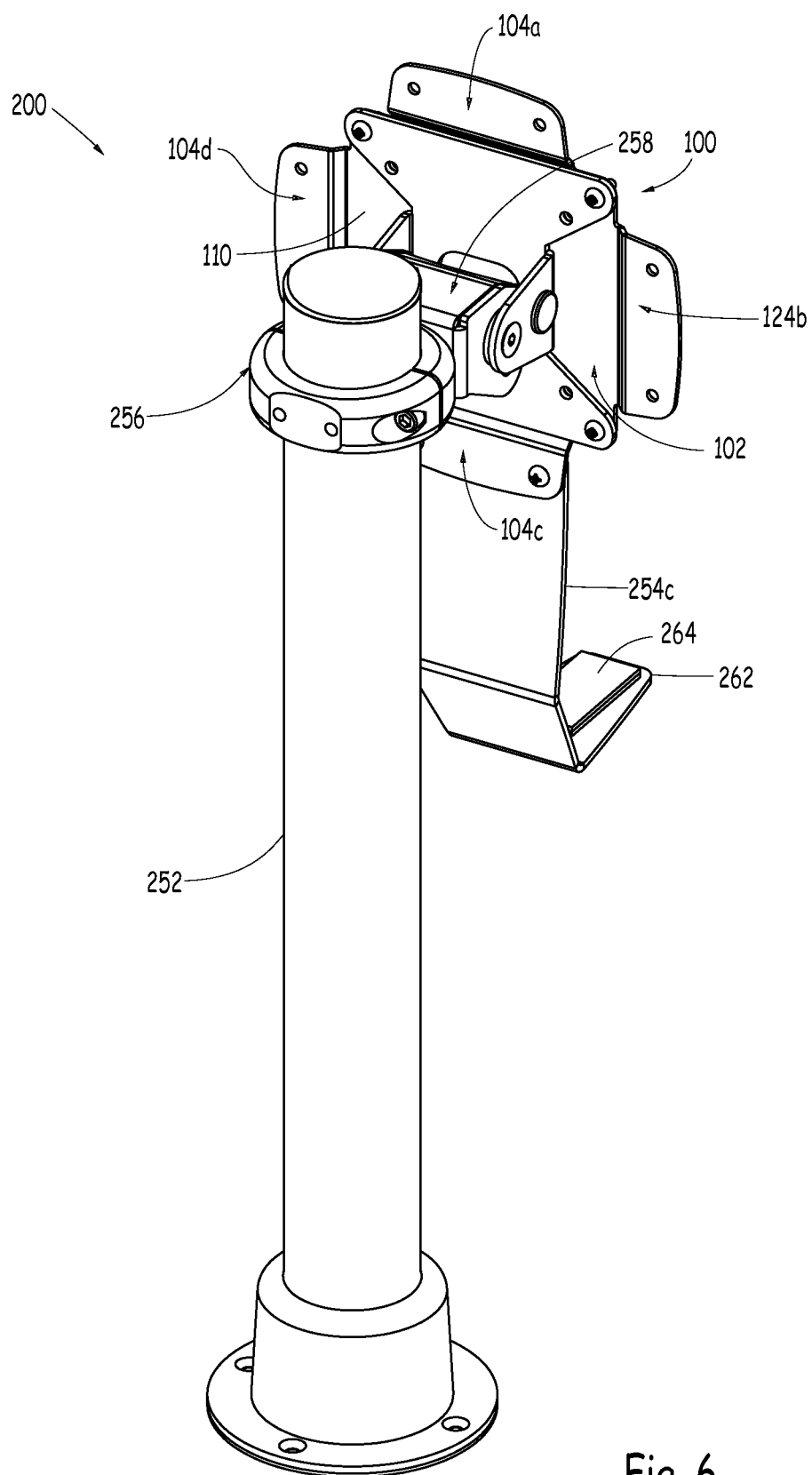
FIG. 6 is a back perspective view the accessory mount assembly illustrated in FIG. 5.

FIG. 5 is a front perspective view and FIG. 6 is a back perspective view of an accessory mount assembly 250 in accordance with one embodiment. Accessory mount assembly 250 includes accessory support bracket 100 coupled to a support stand 252 and an arm plate 254c attached to accessory support bracket 100. More particularly, back mounting surface 110 of base 102 of accessory support bracket 100 is mounted on a display screen bracket 256, which is mounted to support stand 252. In the embodiment illustrated in FIGS. 5 and 6, support stand 252 is a support pole that extends from a top surface of a table top (not illustrated), such as a top surface of a desk, table, counter or check lane, along a substantially vertical axis and terminates at a top end. Support stand 252 provides a structural member for supporting technology components of a workstation. In one embodiment, display screen bracket 256 includes a tilting mechanism 258 for rotating a display screen up or down depending on a user's preferred viewing angle.

In the embodiment illustrated in FIGS. 5 and 6, wing member 104c of accessory support bracket 100 receives and supports arm plate 254c. More specifically, front surface 119c of wing member 104c of accessory support bracket 100 receives and supports arm plate 254c, while a back surface of wing member 104c is left exposed. Arm plate 254c includes a proximal end 260 and a distal end 262. Proximal end 260 is mounted to wing member 104c and distal end 262 receives and supports an accessory or peripheral device 264. Fasteners are inserted through mounting apertures 115 in wing member 104c to couple arm plate 254c to accessory support bracket 100. Exemplary fasteners include screws and pins. It should be realized that one or all of the other wing members 104a, 104b and 104d can also receive and support an arm plate along with wing member 104c receiving and supporting arm plate 254c or, in the alternative, one or all of the other wing members 104a, 104b and 104d can receive and support an arm plate while wing member 104c does not.

Figure 7:
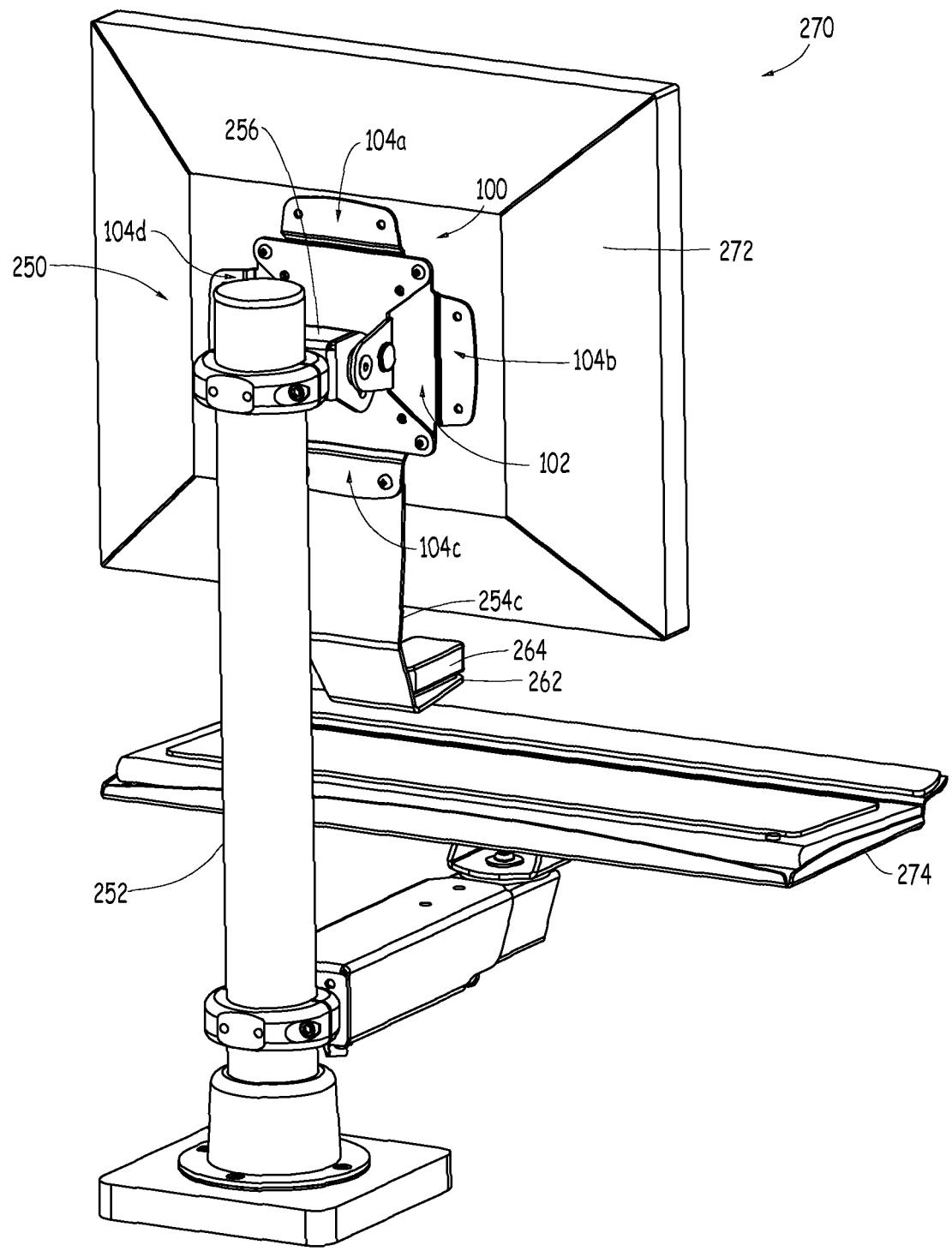
FIG. 7 is a back perspective view of a workstation in accordance with one embodiment and including the accessory mount assembly illustrated in FIGS. 5 and 6, a display screen and a keyboard tray.
Figure 8:
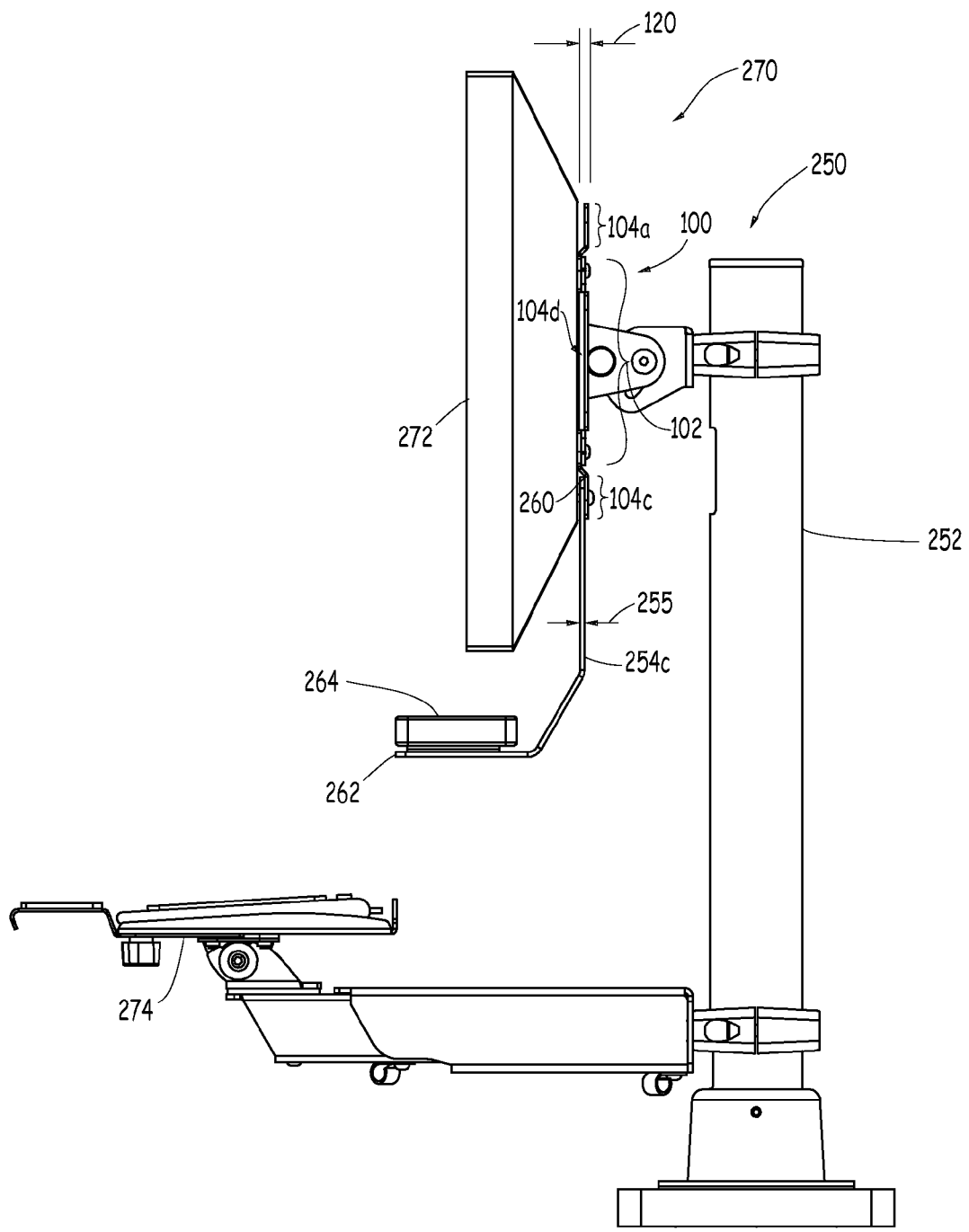
FIG. 8 is a side view of the workstation illustrated in FIG. 7.

FIG. 7 is a back perspective view and FIG. 8 is a side view of a workstation 270 in accordance with one embodiment. Workstation 270 includes accessory mount assembly 250, a display screen 272 and a keyboard tray 274. More particularly, a back of display screen 272 is mounted to front mounting surface 108 (FIG. 5) of base 102 of accessory support bracket 100 such that accessory support bracket 100 is sandwiched or located between display screen 272 and a display screen bracket 256, which is attached to support stand 252.

As discussed above, distance 120 is the distance that each wing member 104a-d is out-of-plane from front mounting surface 108 of base 102. As illustrated in FIG. 8, distance 120 corresponds with a thickness 255 of arm plate 254c and, for that matter, the thickness of any arm plate that is attached to any of the wing members 104a-d. In this way, at least a portion of a front of arm plate 254c is flush with front mounting surface 108 of base 102 such that base 102 and the front surface of arm plate 254c provides for an unobstructed area for display screen 272 to be located.

As illustrated in FIGS. 7 and 8, distal end 262 of arm plate 254c supports an accessory or peripheral device 264. For example, accessory or peripheral device 264 can be a biometric device, such as a thumbprint reader, for authenticating the user of workstation 270. As illustrated, the distal end 262 of arm plate 254c extends forward of and under display screen 272 to provide easy access to accessory or peripheral device 264.

In addition, with accessory support bracket 100 having four wing members 104a-d that extend outwardly from base 102 in four different directions, display screen 272 does not have to be removed to rearrange the position of peripheral device 264. For example, peripheral device 264 can be mounted to an arm plate and coupled to a different one of the wing members 104a-d so as to be placed to the right, to the left or above the display screen without having to remove the display screen.

Figure 9:
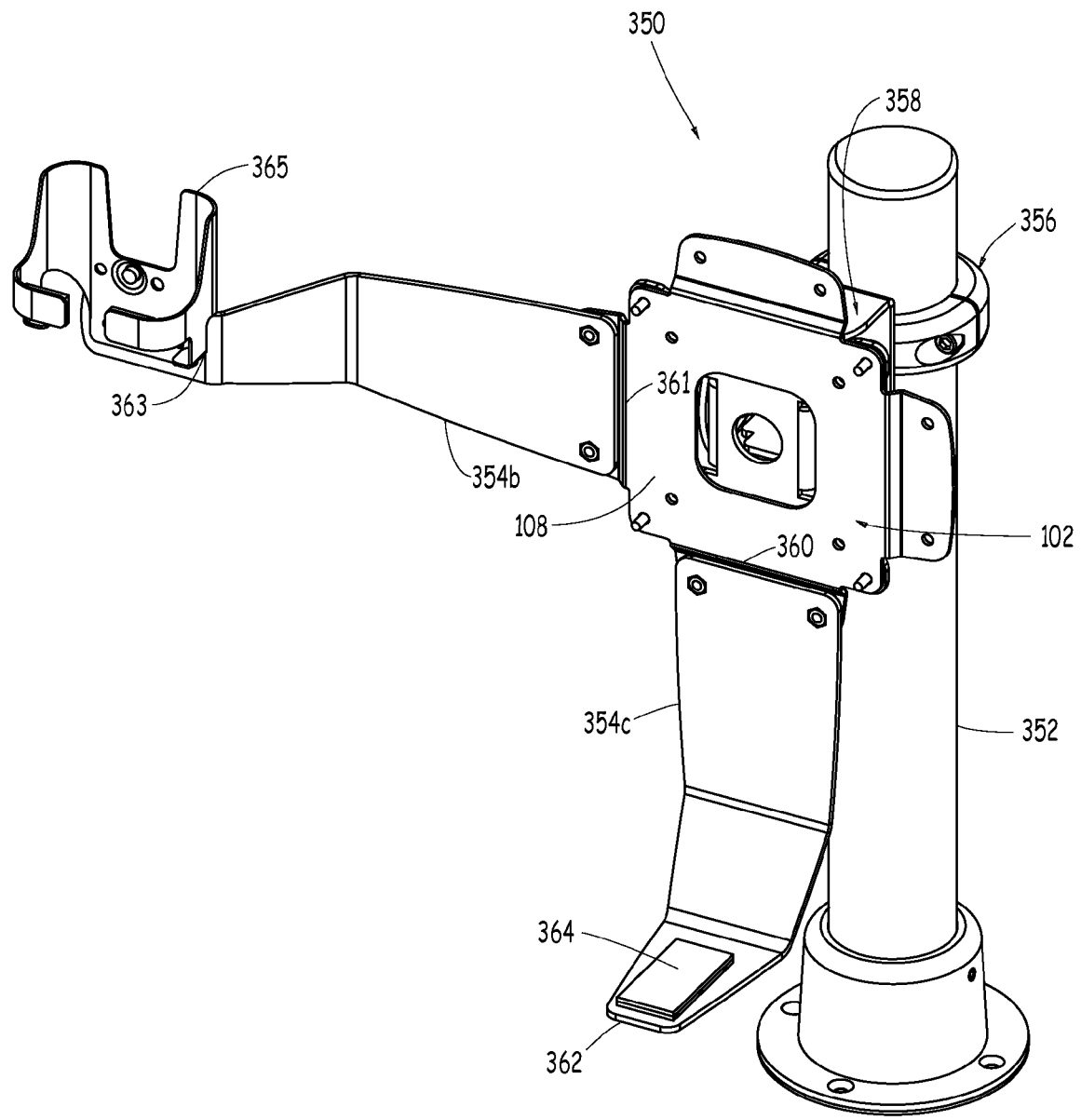
FIG. 9 is a front perspective view of an accessory mount assembly in accordance with another embodiment including the accessory support bracket illustrated in FIGS. 1-4 mounted to a support stand and two arm plates attached to the accessory support bracket.
Figure 10:
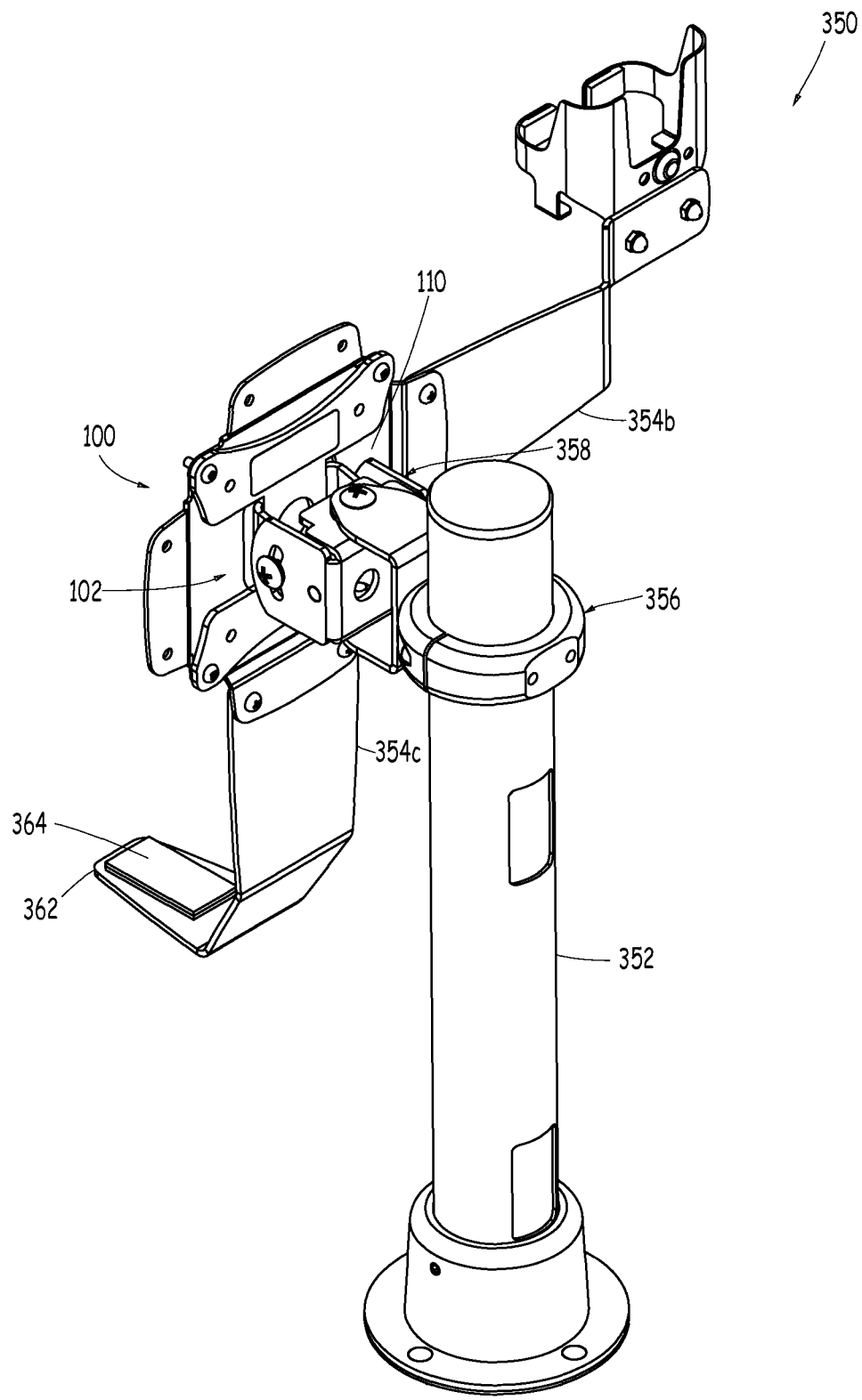
FIG. 10 is a back perspective view of the accessory mount assembly illustrated in FIG. 9.

FIG. 9 is a front perspective view and FIG. 10 is a back perspective view of an accessory mount assembly 350 in accordance with another embodiment. Accessory mount assembly 350 includes accessory support bracket 100 coupled to a support stand 352 and arm plates 354b and 354c attached to accessory support bracket 100. More particularly, back mounting surface 110 of base 102 of accessory support bracket 100 is mounted on a display screen bracket 356, which is mounted to support stand 352. In the embodiment illustrated in FIGS. 9 and 10, support stand 352 is a support pole that extends from a top surface of a table top (not illustrated), such as a top surface of a desk, table, counter or check lane, along a substantially vertical axis and terminates at a top end. Support stand 352 provides a structural member for supporting technology components of a workstation. In one embodiment, display screen bracket 356 includes a tilting mechanism 358 for rotating a display screen up or down depending on a user's preferred viewing angle.

In the embodiment illustrated in FIGS. 9 and 10, two wing members 104b and 104c of accessory support bracket 100 receive and support arm plates 354b and 354c. Wing member 104b corresponds with support arm plate 354b and wing member 104c corresponds with arm plate 354c. More specifically, front surface 119b of wing member 104b of accessory support bracket 100 receives and supports arm plate 354b and front surface 119c of wing member 104c of accessory support bracket 100 receives and supports arm plate 354c, while backs of wing members 104b and 104c are left exposed.

Arm plate 354c includes a proximal end 360 and a distal end 362. Arm plate 354b includes a proximal end 361 and a distal end 363. Proximal end 360 of arm plate 354c is mounted to wing member 104c and distal end 362 receives and supports an accessory or peripheral device 364. Proximal end 361 of arm plate 354b is mounted to wing member 104b and distal end 363 receives and supports an accessory or peripheral device with holder 365. Fasteners are inserted through mounting apertures 115 in wing member 104c to couple arm plate 354c to accessory support bracket 100. Fasteners are inserted through mounting apertures 115 in wing member 104b to couple arm plate 354b to accessory support bracket 100. Exemplary fasteners include screws and pins. It should be realized that one or all of the other wing members 104a and 104d can also receive and support an arm plate along with wing members 104b and 104c receiving support arm plates 254b and 254c or, in the alternative, one or all of the other wing members 104a and 104d can receive and support an arm plate while wing members 104b and 104c do not.

Figure 11:
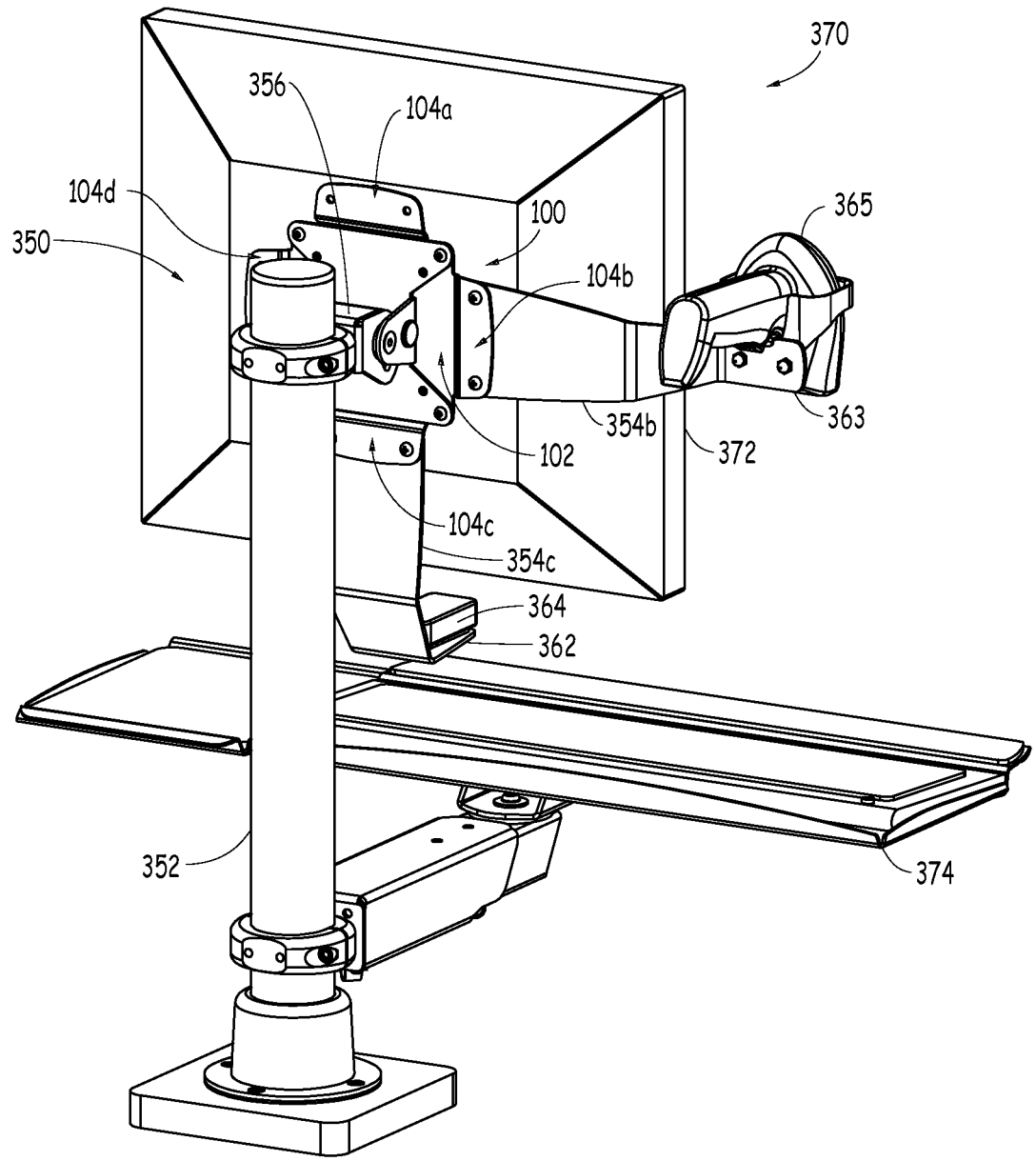
FIG. 11 is a back perspective view of a workstation in accordance with another embodiment including the accessory mount assembly illustrated in FIGS. 9 and 10, a display screen and a keyboard tray.
Figure 12:
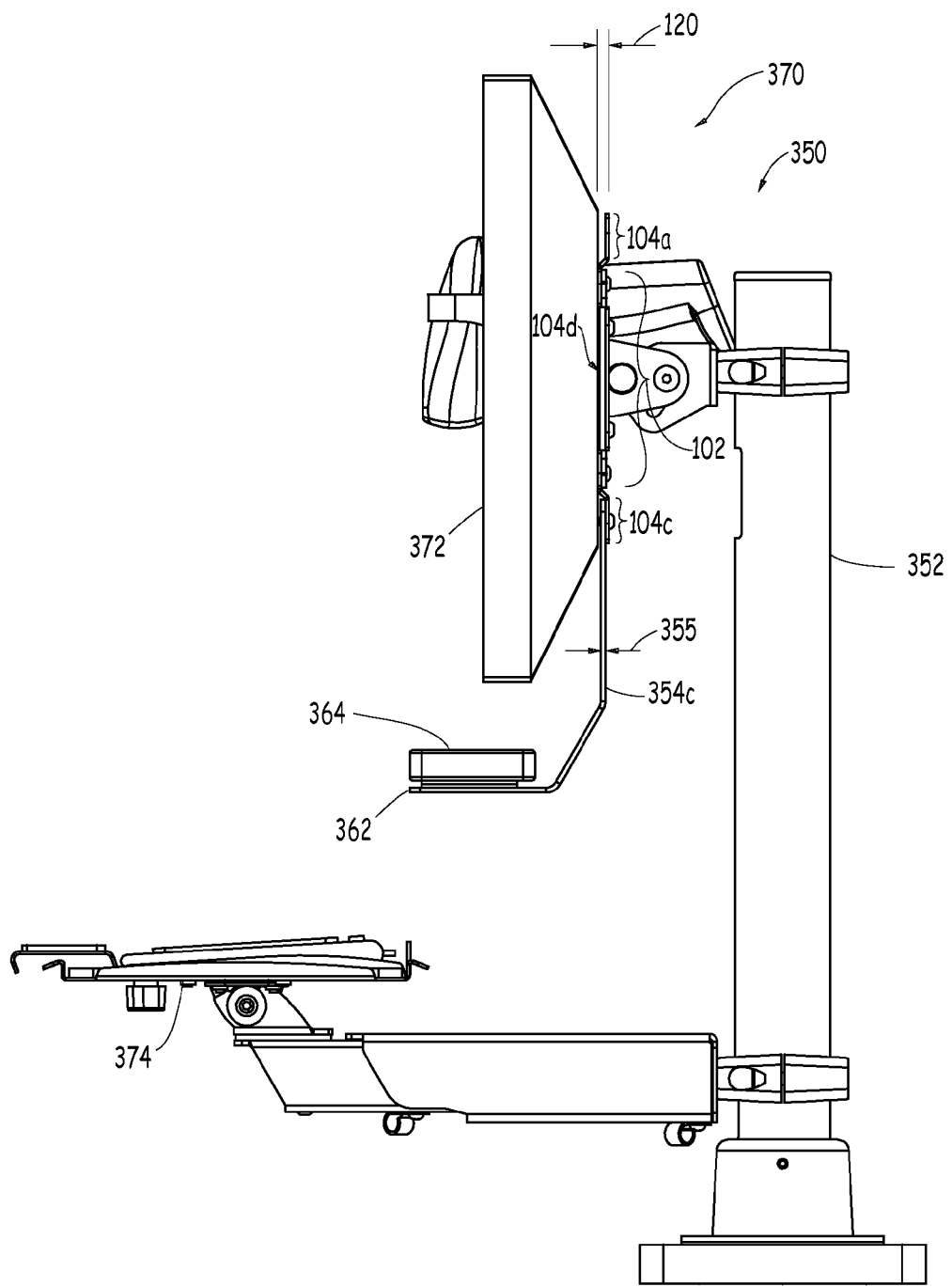
FIG. 12 is a side view of the workstation illustrated in FIG. 11.

FIG. 11 is a back perspective view and FIG. 12 is a side view of a workstation 370 in accordance with one embodiment. Workstation 370 includes accessory mount assembly 350, a display screen 372 and a keyboard tray 374. More particularly, a back of display screen 372 is mounted to front mounting surface 108 (FIG. 9) of base 102 of accessory support bracket 100 such that accessory support bracket 100 is sandwiched or located between display screen 372 and a display screen bracket 356, which is attached to support stand 352.

As discussed above, distance 120 is the distance that each front surface 119a-d of each wing member 104a-d is out-of-plane from front surface 108 of base 102. As illustrated in FIG. 12, distance 120 corresponds with a thickness 355 of arm plates 354b and 354c and, for that matter, the thickness of any arm plate that is attached to any of the wing members 104a-d. In this way, at least a portion of the fronts of arm plates 354b and 354c are flush with front mounting surface 108 of base 102 such that base 102 and the front surfaces of arm plates 354b and 354c provide for an unobstructed area for display screen 372 to be located.

As illustrated in FIGS. 11 and 12, distal ends 363 and 362 of arm plates 354b and 354c support accessory or peripheral devices 365 and 364. For example, accessory or peripheral device 364 located on arm plate 354c can be a biometric device, such as a thumbprint reader, for authenticating the user of workstation 370. As illustrated, distal end 362 of arm plate 354c extends forward of and under display screen 372 to provide easy access to accessory or peripheral device 364. In another example, accessory or peripheral device 365 located on arm plate 354b can be an optical scanner or reader with holder for scanning or reading bar codes and the like. The scanner or reader with holder in the embodiment illustrated in FIGS. 11 and 12 is a handheld device that can operate either while being supported by distal end 363 of arm plate 354b or removed and used in a user's hand.

As illustrated, distal end 363 of arm plate 354b extends to the left of and forward of display screen 372 to provide easy access to accessory or peripheral device with holder 365 on the left side of display screen 372. In the alternative, scanner or reader with holder 365 could be mounted to an arm plate that is attached to wing member 104d to provide easy access to scanner or reader with holder on the right side of display screen 372. Other exemplary accessory and peripheral devices that can be mounted to an arm plate that attaches to one of the plurality of wing members 104a-d include, but are not limited to, a printer, an electronic payment processing module and video camera. In particular, wing member 104a is specifically suitable for a video camera.

In addition, with accessory support bracket 100 having four wing members 104a-d that extend outwardly from base 102 in four different directions, display screen 372 does not have to be removed to rearrange the position of peripheral devices 364 and 365. For example, peripheral device 364 can be mounted to an arm plate and coupled to a different one of the wing members 104a-d so as to be placed to the right, to the left or above the monitor.

A method of assembling a computer workstation, such as workstation 270 or 370, includes coupling a back 110 of support bracket 100 to a support stand, such as support stand 252 or 352. The method further includes mounting at least one arm plate, such as arm plate 254c, 354b or 354c, to a front of one of the four wing members 104a-d of support bracket 100. The at least one arm plate extends from a proximal end, such as proximal end 260, 360 or 361, to a distal end, such as distal end 262, 362 or 363, and supports an accessory, such as accessory 264, 364 and 365. The method further includes mounting a display screen, such as display screen 272 or 372, to a front of base 102 of support bracket 100. The accessory is then mounted to the distal end of the arm plate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A support bracket comprising:
a fixed portion having a first mounting surface and a second mounting surface opposite the first mounting surface, wherein the first mounting surface couples to a display screen and the second mounting surface couples to a support stand;
a plurality of free portions each having a mounting surface that is configured to couple to an arm plate, the arm plate including a proximal end mounted to the at least one free portion and distal end that supports a peripheral device;
a plurality of connecting portions each corresponding to one of the plurality of free portions and extending from the fixed portion and coupling the corresponding free portions to the fixed portion;
wherein each mounting surface of each free portion is oriented substantially parallel to the first mounting surface of the fixed portion and each connecting portion that extends from the fixed portion causes the mounting surface to be out-of-plane from the first mounting surface of the fixed portion by a distance; and wherein the distance each mounting surface of each free portion is out-of-plane from the front mounting surface of the fixed portion substantially corresponds with a thickness of the arm plate such that a portion of a front surface of the arm plate is substantially in alignment with the first mounting surface of the fixed portion.

2. The support bracket of claim 1, wherein the fixed portion comprises holes for receiving fasteners to couple the display screen to the first mounting surface and the support stand to the second mounting surface.

3. The support bracket of claim 1, wherein the fixed portion is defined by four sides, each of the four sides is coupled to one of the connecting portions.

4. The support bracket of claim 1, wherein the fixed portion, each free portion and each connecting portion of the support bracket comprise a single, continuous piece of material.

5. The support bracket of claim 4, wherein each connecting portion is defined between a first connecting bend line and a second connecting bend line that is spaced apart from the first connecting bend line.

6. A method of assembling a workstation, the method comprising:
coupling a back of a support bracket to a support stand, the support bracket including a base defined by a front support surface and four sides, four wing members each extending from one of the four sides of the base and four transition areas that couple each wing member to the base and orient front surfaces of each wing member out-of-plane from the front support surface of the base by a distance;
mounting at least one arm plate to the front surface of one of the four wing members of the support bracket such that the at least one arm plate extends from a proximal end to a distal end and supports an accessory, wherein the distance each front surface of each wing member is out-of-plane from the front support surface of the base substantially corresponds with a thickness of the arm plate such that a portion of a front surface of the arm plate is substantially in alignment with the front support surface of the base; and
mounting a display screen to the front support surface of the base of the support bracket such that a back of the display screen is directly adjacent the front support surface of the base and directly adjacent the front surface of the arm plate.

7. The method of claim 6, further comprising mounting the accessory to the distal end of the arm plate.

8. The method of claim 6, further comprising removing the at least one arm plate that supports the accessory from the front surface of one of the four wing member and mounting the accessory so that it couples to the front surface of a different one of the four wing members.

* * * * *